(12) United States Patent
Ozozlu et al.

(10) Patent No.: US 10,693,241 B2
(45) Date of Patent: Jun. 23, 2020

(54) MULTI-ANTENNA CONTROL IN WIRELESS USER DEVICES

(71) Applicant: Sprint Communications Company L.P., Overland Park, KS (US)

(72) Inventors: Akin Ozozlu, McLean, VA (US); Nagi A. Mansour, Arlington, VA (US); Kevin Almon Hart, Oakton, VA (US); Noman Muzaffar Alam, Chantilly, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/687,310

(22) Filed: Nov. 18, 2019

(65) Prior Publication Data

US 2020/0091620 A1 Mar. 19, 2020

Related U.S. Application Data

(63) Continuation of application No. 15/852,294, filed on Dec. 22, 2017, now Pat. No. 10,522,921.

(51) Int. Cl.
| | |
|---|---|
| *H01Q 21/24* | (2006.01) |
| *H01Q 21/06* | (2006.01) |
| *H04W 76/14* | (2018.01) |
| *H04B 7/08* | (2006.01) |
| *H04B 7/06* | (2006.01) |
| *H04W 52/02* | (2009.01) |
| *H04W 92/18* | (2009.01) |
| *H04W 4/70* | (2018.01) |

(52) U.S. Cl.
CPC .......... *H01Q 21/24* (2013.01); *H01Q 21/062* (2013.01); *H01Q 21/065* (2013.01); *H04B 7/0608* (2013.01); *H04B 7/0691* (2013.01); *H04B 7/0693* (2013.01); *H04B 7/0805* (2013.01); *H04B 7/0877* (2013.01); *H04W 52/0277* (2013.01); *H04W 76/14* (2018.02); *H04W 92/18* (2013.01); *H04W 4/70* (2018.02); *H04W 52/0232* (2013.01); *Y02D 70/444* (2018.01)

(58) Field of Classification Search
CPC .............................. H01Q 21/24; H01Q 21/06
USPC ........................................................ 343/729
See application file for complete search history.

(56) References Cited

U.S. PATENT DOCUMENTS

| | | | |
|---|---|---|---|
| 2015/0282154 A1 | 10/2015 | Yavuz et al. | |
| 2015/0341100 A1* | 11/2015 | Kwak | H04L 25/0224 370/329 |
| 2017/0150480 A1* | 5/2017 | Kim | H04W 72/02 |

FOREIGN PATENT DOCUMENTS

WO 2012177218 A2 12/2012

* cited by examiner

*Primary Examiner* — Andrea Lindgren Baltzell

(57) ABSTRACT

Wireless communication devices have antennas, and the antennas have earth-orientations. The wireless devices exchange network signaling with a wireless access node over the antennas. Some of network signaling indicates Device-to-Device (D2D) communication times and frequencies. The wireless communication devices exchange device signaling with each other over the antennas using the D2D communication times and frequencies. Some of the device signaling indicates the earth orientations for the antennas. The wireless communication devices select a subset of the antennas based on the earth orientations. The wireless communication devices exchange user data with each other over the selected subset of antennas using the D2D communication times and frequencies.

20 Claims, 8 Drawing Sheets

MULTI-ANTENNA CONTROL IN WIRELESS USER DEVICES

RELATED CASES

This United States Patent Application is a continuation of U.S. patent application Ser. No. 15/852,294 that was filed on Dec. 22, 2017 and is entitled, "MULTI-ANTENNA CONTROL IN WIRELESS USER DEVICES." U.S. patent application Ser. No. 15/852,294 is hereby incorporated by reference into this United States Patent Application.

TECHNICAL BACKGROUND

Wireless communication networks exchange wireless signals with user communication devices to support user services like virtual reality, augmented reality, media conferencing, and interactive gaming. The user communication devices may be phones, computers, headsets, machines, and the like. The wireless communication network has wireless access points that exchanges wireless signals with the user communication devices.

The wireless access points and the user communication devices each have antennas to facilitate the wireless communications. In typical scenarios, the wireless access points may have several antennas, and the user communication devices have only a few antennas. Thus, the antenna configuration of a wireless access point is relatively complex, and the antenna configuration of a user communication device is relatively simple. Wireless communication technologies like massive Multiple Input Multiple Output (MIMO) and beamforming often use several antennas at the wireless access point and a few antennas at the user communication device.

Wireless Device-to-Device (D2D) communications entail the transmission and reception of wireless signals directly between user communication devices without using the wireless access point, although the wireless access point may provide D2D scheduling instructions to the user communication devices. The wireless D2D communications use the antennas in the user communication devices and not the antennas in the wireless access points.

Newer user communication devices use higher radio frequencies in the 6-60 Gigahertz range. This reduces the size of the antennas to a few millimeters in length. Numerous antennas of this size may be metallically printed on a transceiver microprocessor, and some transceiver chips may have as many as 32 or 64 antennas. Thus, newer user communication devices may have 64 or more antennas. Unfortunately, the newer user communication devices are often still battery powered, and the large number of antennas causes a larger battery drain.

When a battery-powered user communication device has substantially drained its battery, the device often enters a low-power mode to conserve remaining battery power. The low-power mode may entail a reduction in the number of antennas being used. For example, a user communication device using all 64 of its antennas may reduce that number to eight in a low-power mode. The large number of antennas in some user communication devices adds complexity to low-power mode given the higher number of antenna configuration options. The antenna complexity in low-power mode is even more challenging when the user communication devices are engaging in wireless D2D communications.

TECHNICAL OVERVIEW

Wireless communication devices have antennas, and the antennas have earth-orientations. The wireless devices exchange network signaling with a wireless access node over the antennas. Some of network signaling indicates Device-to-Device (D2D) communication times and frequencies. The wireless communication devices exchange device signaling with each other over the antennas using the D2D communication times and frequencies. Some of the device signaling indicates the earth orientations for the antennas. The wireless communication devices select a subset of the antennas based on the earth orientations. The wireless communication devices exchange user data with each other over the selected subset of antennas using the D2D communication times and frequencies.

DETAILED DESCRIPTION

Figure 1:
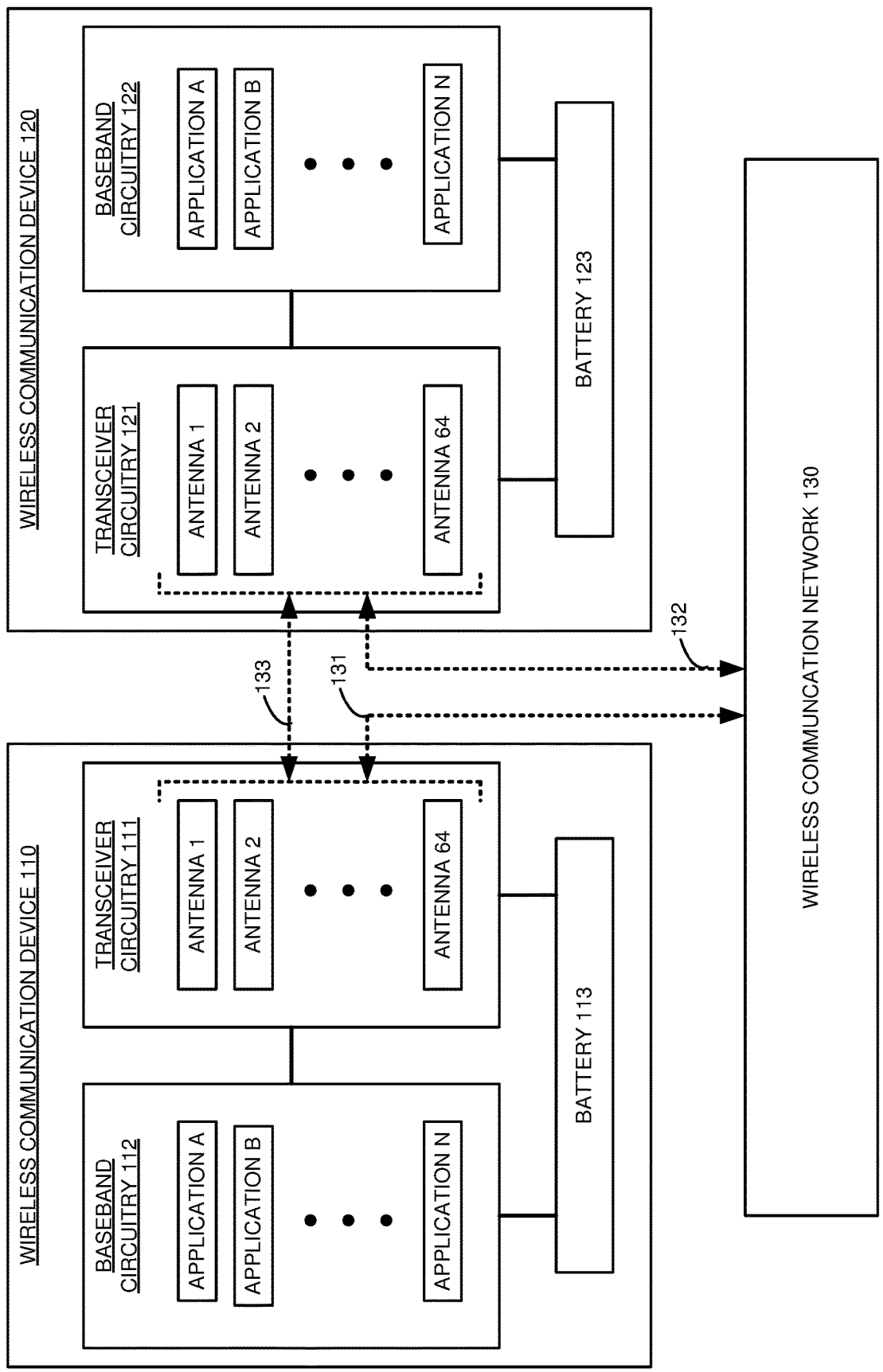
FIG. 1 illustrates a wireless communication device to control a multitude of antennas and exchange antenna data.

FIG. 1 illustrates wireless communication device 110 to control antennas and exchange user data. Wireless communication device 110 could be a computer, phone, headset, graphic display, intelligent machine, or some other user apparatus. Wireless communication device 110 comprises transceiver circuitry 111, baseband circuitry 112, and battery 113. In this example, transceiver circuitry 111 includes 64 antennas that are numbered 1-64, although transceiver circuitry 111 may have a different number of antennas in other examples. Baseband circuitry 112 executes multiple user applications that are referred to as user applications A-N. Exemplary user applications include audio/video conferencing, social networking, virtual/augmented reality, interactive gaming, and internet/enterprise access. Battery 113 supplies power to transceiver circuitry 111 and baseband circuitry 112 and indicates its reserve battery power.

Wireless communication device 110 comprises computer hardware and software that are configured and integrated together to form a special-purpose machine. The computer hardware comprises processing circuitry like Central Processing Units (CPUs), Digital Signal Processors (DSPs), Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like Control Units (CUs), Logic Units (LUs), and Random Access Memory (RAM). In turn, the CUs, LUs, and RAM are metallically connected to form CPUs, DSPs, GPUs, transceivers, bus circuitry, and memory.

In the computer hardware, the CUs drive data between the RAM and the LUs, and the LUs operate on the data. The CUs also drive interactions with external memory like flash drives, disk drives, and the like. The computer hardware executes machine-level software to control and move data by driving machine-level inputs like voltages and currents to the CUs, LUs, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware into the special purpose machine described herein.

Transceiver circuitry 111 includes antennas 1-64, although other numbers of antennas could be used. Antennas 1-64 may each comprise metallic diploe, metallic patch, or some other type of antenna. Transceiver circuitry 111 also has circuitry like modulators, amplifiers, filters, DSPs, and the like. Transceiver circuitry 111 uses wireless network protocols like Fifth Generation New Radio (5G NR) wireless.

Baseband circuitry 112 comprises computer hardware like CPUs, RAM, persistent data storage, bus interfaces, user interfaces, and data transceivers. Baseband circuitry 112 also has computer software like operating systems, user applications A-N, user interfaces, and network interfaces.

Wireless user device 120 could be like wireless user device 110. Wireless user device 120 also comprises transceiver circuitry 121, baseband circuitry 122, and battery 123. Transceiver circuitry 121 includes 64 antennas, although another number of antennas could be used. Baseband circuitry 122 executes user applications A-N. Battery 123 powers circuitry 121-122.

Wireless communication network 130 comprises network elements like wireless access points, network gateways, network controllers, content servers, and user databases. Wireless communication network 130 uses a wireless networking protocol like 5G NR.

As battery 113 supplies power, battery 113 drains until it is dead. During the battery drain, battery 113 indicates its shrinking amount of reserve battery power to baseband circuitry 112. Baseband circuitry 112 also executes user applications which generate and consume user data. Baseband circuitry 112 identifies internal antenna data that indicates on/off status, reserve battery power, geometric earth-orientation, and the user applications for the individual internal antennas 1-64. The geometric earth-orientation may be specified by azimuth (geographic direction) and angle (with the ground) or by some other coordinate system. The geometric earth-orientation can be further qualified over time as static or random based on the frequency of geometric earth-orientation changes.

Baseband circuitry 113 selects a set of internal antennas 1-64 based on the internal antenna data. For example, baseband circuitry 113 may initialize with a default configuration that uses all 64 antennas and then reduce the active antennas in response to low reserve power. In some examples, baseband circuitry 113 reduces the number active transmitting antennas to conserve power and/or serve a download-centric application. Due to the large number of antennas, orientations, and applications, baseband circuitry 113 matches communication demands from the user applications with optimal but smaller sets of the antennas. Thus, baseband circuitry 113 may selects a transmit set of internal transmit antennas and separately selects a receive set of internal receive antennas. An individual antenna may be selected to be on or off, and when the antenna is on, the antenna can be further selected to be receive only, transmit only, or both receive and transmit.

Baseband circuitry 113 transfers communication instructions to transceiver circuitry 111. Transceiver circuitry 111 wirelessly exchanges the user data over the selected set of internal antennas 1-64 responsive to the communication instructions. For example, baseband circuitry 113 may select a set of 8 antennas to save power given the current user applications—emailing and audio streaming. The antennas might be selected to support a MIMO configuration where four antennas having the same orientation are used to simultaneously transmit and receive a first wireless signal to support the emailing application, and four other antennas at a different orientation simultaneously transmit and receive another wireless signal to support the audio streaming application.

In some examples, transceiver circuitry 111 exchanges the user data with wireless communication network 130 over wireless link 131. Transceiver circuitry 111 may also wirelessly transmits its internal antenna data to wireless communication network 130 over wireless link 131. In other examples, transceiver circuitry 111 exchanges the user data with transceiver 121 in wireless communication device 120 over wireless link 133. Transceiver circuitry 111 may also wirelessly transmit its internal antenna data to transceiver 121 over wireless link 133.

In some examples, transceiver circuitry 111 wirelessly receives external antenna data from wireless communication device 120 over wireless link 133 or through wireless network 130 and links 131-132. The external antenna data indicates the on/off status, reserve battery power, geometric earth-orientation, and user applications for the individual antennas in wireless communication device 120. Baseband circuitry 112 selects its set of internal antennas 1-64 in transceiver circuitry 111 based on both the internal antenna data and the external antenna data. For example, baseband circuitry 122 may select a set of four antennas having the same orientation and notify baseband circuitry 112 over transceivers 111 and 121. Baseband circuitry 112 then selects a larger set of its antennas that also share the same antenna orientation as the four selected antennas in wireless communication device 120.

In some examples, the wireless exchange of user data comprises direct Device-to-Device (D2D) communications over wireless link 133 between transceiver circuitry 111 in wireless communication device 110 and transceiver circuitry 121 in wireless communication device 120. The D2D communications may use beamforming, Multiple Input Multiple Output (MIMO), and/or Carrier Aggregation (CA) over wireless link 133.

In some examples, baseband circuitry 112 separately selects transmitting antennas and receiving antennas— which can be the same antenna. Baseband circuitry 112 determines transmitting on/off and receiving on/off status for the individual internal antennas. Transceiver circuitry 111 wirelessly transmits and receives user data over the selected transmitting antennas and the selected receiving antennas responsive to the communication instructions. For example, baseband circuitry 112 may reduce the transmitting antennas responsive to low reserve power. Baseband circuitry 112 may reduce the transmitting antennas responsive to a download-centric user application like media streaming or internet browsing. Baseband circuitry 112 may also increase the receiving antennas responsive to the download-centric user.

Figure 2:
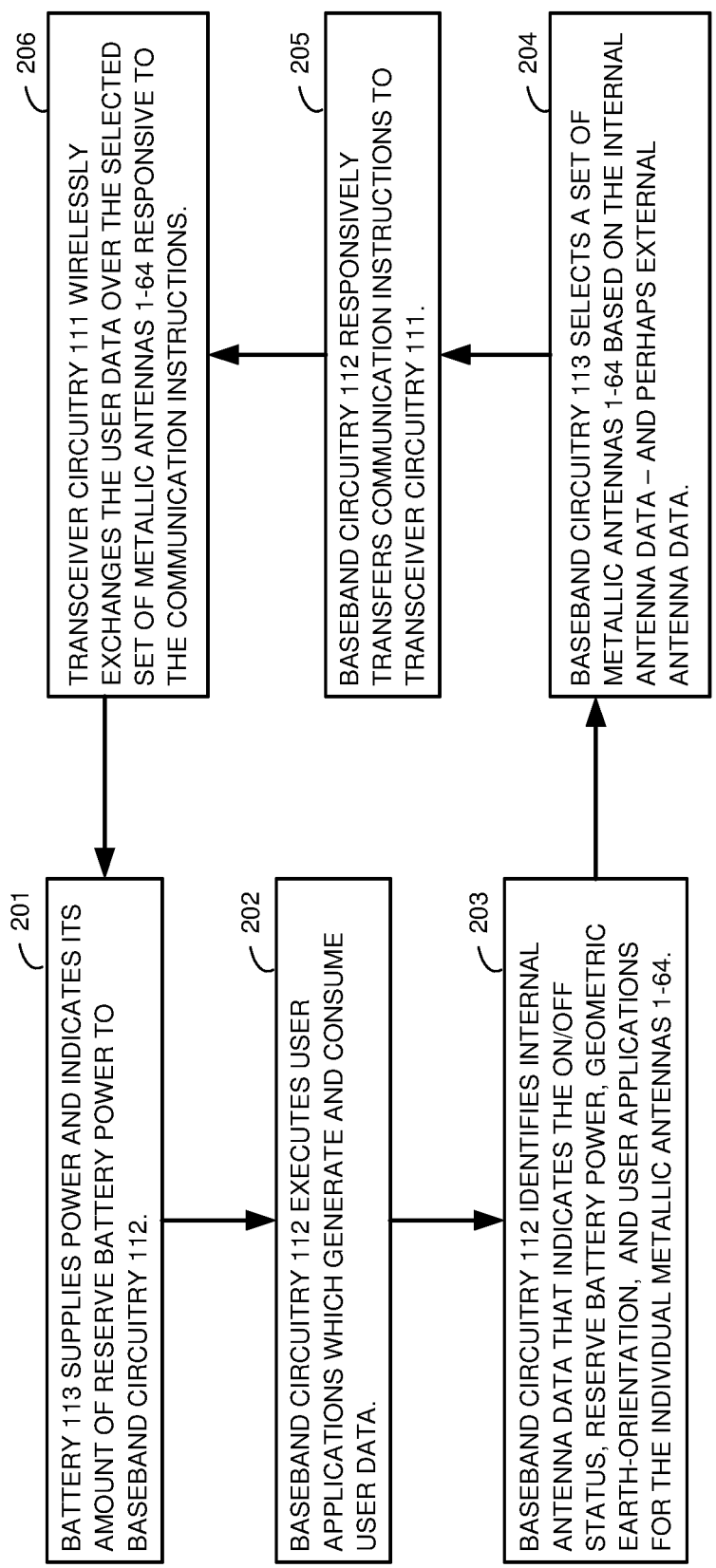
FIG. 2 illustrates the operation of the wireless communication device to control a multitude of antennas and exchange antenna data.

FIG. 2 illustrates the operation of wireless communication device 110 to control antennas and exchange user data. Battery 113 supplies power and indicates its shrinking amount of reserve battery power to baseband circuitry 112 (201). Baseband circuitry 112 executes several user applications which generate and consume user data (202). Baseband circuitry 112 identifies internal antenna data that indicates the on/off status, reserve battery power, geometric earth-orientation, and user applications for the individual internal antennas 1-64 (203).

Baseband circuitry 113 selects a set of internal antennas 1-64 based on the internal antenna data—and perhaps based on external antenna data as well (204). Baseband circuitry 112 responsively transfers communication instructions to transceiver circuitry 111 (205). Transceiver circuitry 111 wirelessly exchanges the user data over the selected set of internal antennas 1-64 responsive to the communication instructions (206). For example, baseband circuitry 112 may select all 64 antennas given a large reserve power supply and many executing user applications. In another example, baseband circuitry 112 may select only 4 antennas given a low reserve power supply and a single executing user application. Baseband circuitry 112 may also select various transmit/receive antenna combinations given the reserve power supply, the user applications, and the specific configurations for MIMO, beamforming, and/or D2D.

Advantageously, baseband circuitry 112 shares antenna data with other user devices and network elements. The distribution of detailed antenna data provides key information when baseband circuitry 112 balances low-power conditions with user applications—especially when implementing wireless D2D links that use MIMO and/or beamforming.

Figure 3:
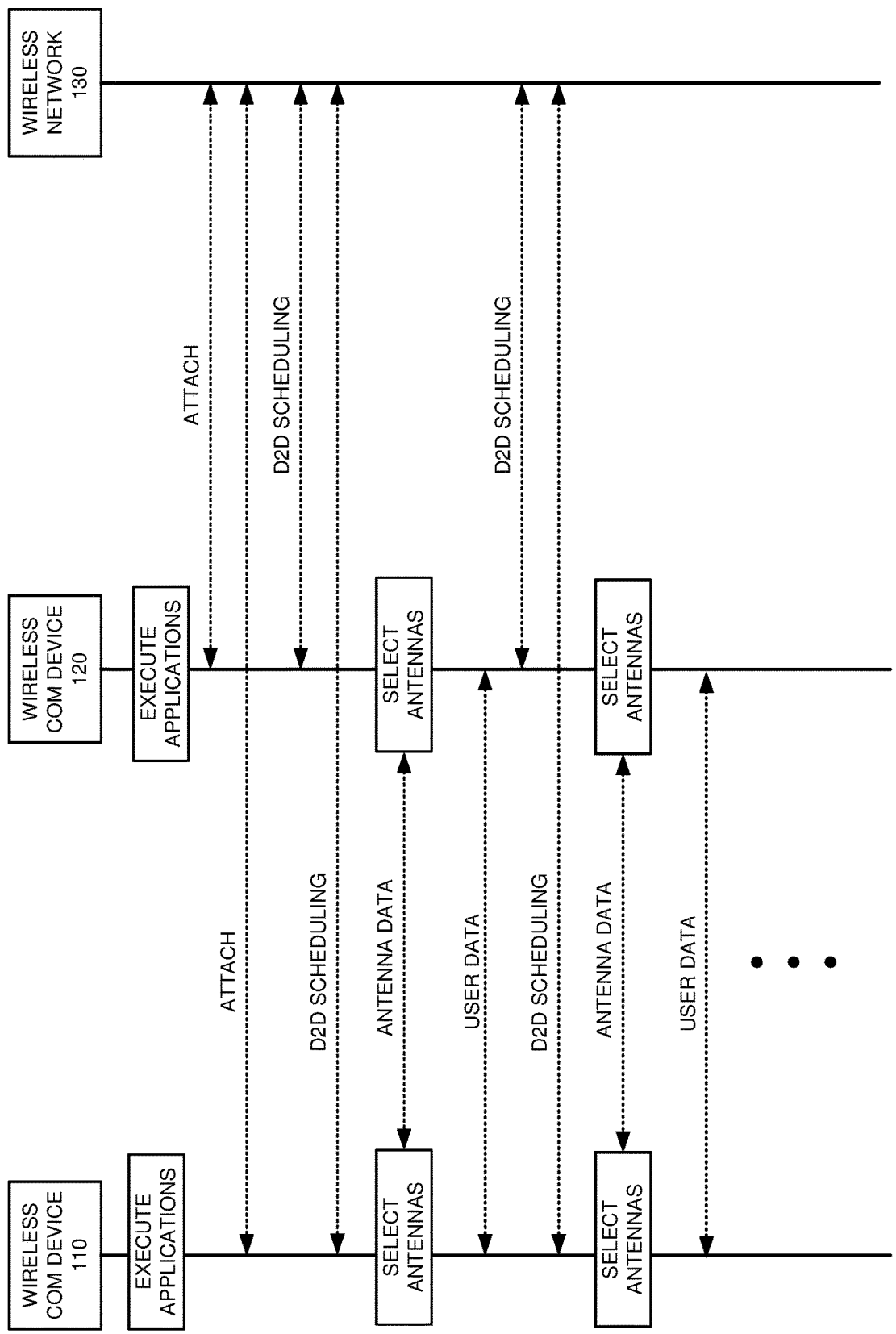
FIG. 3 illustrates the operation of wireless communication devices to control antennas and exchange antenna data.

FIG. 3 illustrates the operation of wireless communication devices 110 and 120 to control antennas and exchange user data over a wireless Device-to-Device (D2D) link. Wireless communication devices 110 and 120 wirelessly attach to wireless communication network 130. Wireless communication network 130 and wireless communication devices 110 and 120 then exchange signaling over wireless links 131-132 to schedule future D2D communications directly between devices 110 and 120 over wireless link 133. Wireless communication devices 110 and 120 identify their own antenna data and exchange their antenna data over wireless link 133.

For example, wireless communication device 110 may have low reserve power but a download-centric user application like audio streaming from wireless communication device 120. As a result, wireless communication device 110 may select four orthogonal transmit antennas and all 64 receive antennas to optimize reliability but save transmit power for the download centric audio streaming application. Wireless communication devices 110 and 120 then drive their selected antennas to exchange user data over wireless link 133 to serve the user applications. In an exemplary operation, wireless communication devices 110 and 120 may exchange audio data where power-challenged device 110 uses only a few transmitting antennas, and power-strong device 120 uses all 64 antennas to transmit and receive.

Figure 4:
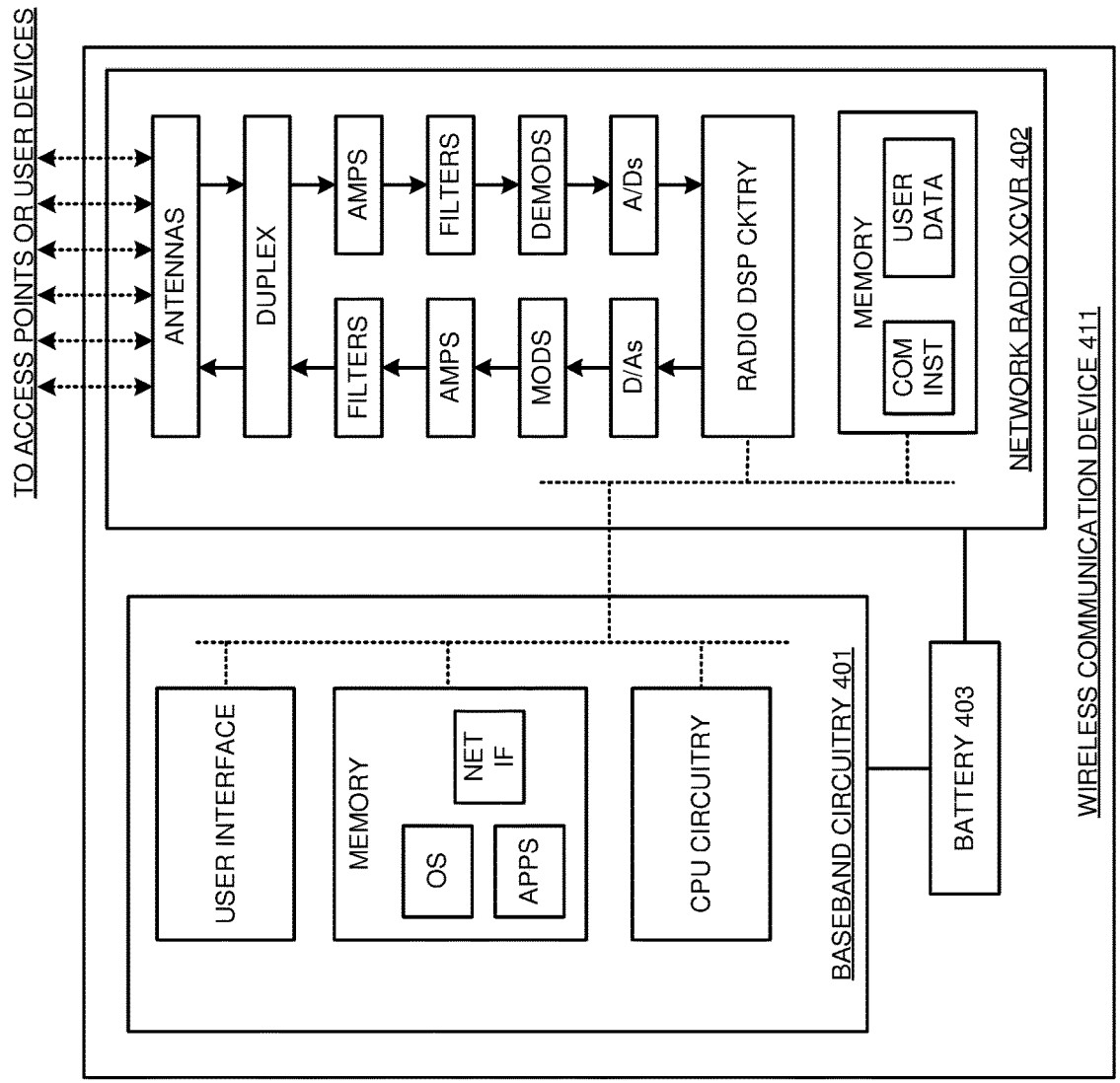
FIG. 4 illustrates a wireless communication device to control a multitude of antennas and exchange antenna data with wireless user devices or wireless access points.

FIG. 4 illustrates wireless communication device 400 to control antennas and exchange antenna data with wireless user devices or wireless access points. Wireless communication device 411 is an example of wireless communication devices 110 and 120, although devices 110 and 120 may have other configurations and operations. Wireless communication device 411 comprises baseband circuitry (CKTRY) 401, network radio transceiver 402, and battery 403.

Network radio transceiver 402 comprises antennas, duplexers (DUPLEX), modulators (MODS), filters, amplifiers (AMPS), Analog-to-Digital converters (A/Ds), Digital-to-Analog converters (D/As), radio DSP circuitry, memory, and bus interfaces. The memory stores user data and communication instructions (COM INST). The DSP circuitry drives wireless communications with wireless access points and/or wireless user devices.

Baseband circuitry 401 comprises CPU circuitry, memory, user interface, and bus interfaces. The memory stores software components like an operating system (OS), network interface application (NET IF), and user applications (APPs). The bus interfaces of network radio transceiver 402 and baseband circuitry 401 are coupled together over data connections, and the bus interfaces and data connections appear as dotted lines on FIG. 4. The CPU circuitry executes the operating system to interface between the CPU circuitry and the other software components. The network interface application drives signaling and user data exchanges over network connections. The user applications provide user services like media conferencing, interactive gaming, internet access, and the like. The user interface drives components to interact with a user like displays, microphones, speakers, jacks, buttons, and the like.

In operation, network radio transceiver 402 wirelessly attaches to wireless access points in a wireless communication network using a default antenna configuration that has all antennas active for both transmit and receive. Network radio transceiver 402 identifies its antenna data and exchanges antenna data with the serving wireless access points in the wireless communication network. Thus, network radio transceiver 402 receives external antenna data from the wireless access points. The network interface in baseband circuitry 401 processes this antenna data to select the transmitting antennas and the receiving antennas in network radio transceiver 402. Baseband circuitry 401 then drives network radio transceiver 402 to exchange signaling and user data over the selected transmit and receive antennas.

As power drains in battery 403, the network interface in baseband circuitry 401 modifies its antenna configuration and reports the corresponding antenna data over network radio transceiver 402 to the wireless access points or user devices. For example, if battery 403 has low reserve power and only a download-centric user application is on, then baseband circuitry 401 reduces the receive antenna configuration to only four orthogonal receive antennas. In another example where battery 403 is strong and wireless communication device is stationary, baseband circuitry 401 may select four orthogonal groups of 16 antennas each, and each antenna group transfers a different signal to provide four simultaneous data flows that support a single virtual reality user application.

Figure 5:
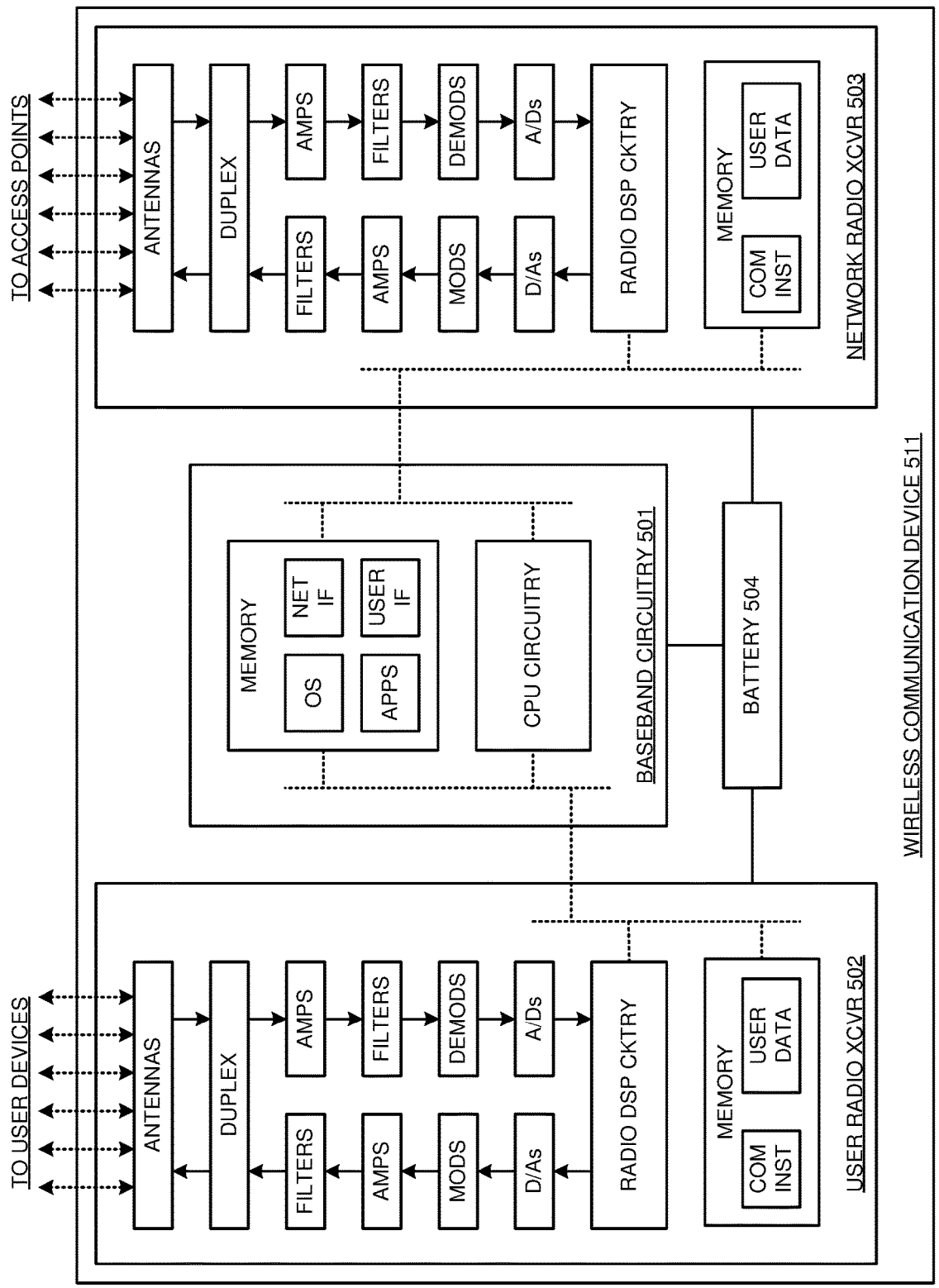
FIG. 5 illustrates a wireless communication device to control a multitude of antennas and exchange antenna data with both wireless user devices and wireless access points.

FIG. 5 illustrates wireless communication device 511 to control antennas and exchange antenna data with both wireless user devices and wireless access points. Wireless communication device 511 is an example of wireless communication devices 110 and 120, although devices 110 and 120 may have other configurations and operations. Wireless communication device 511 comprises baseband circuitry 501, user radio transceiver 502, network radio transceiver 503, and battery 504.

User radio transceiver 502 comprises antennas, duplexers, modulators, filters, amplifiers, Analog-to-Digital converters, Digital-to-Analog converters, radio DSP circuitry, memory, and bus interfaces. The memory stores user data and communication instructions. The DSP circuitry drives wireless communications with wireless user devices—including wireless D2D communications. Network radio transceiver 503 comprises antennas, duplexers, modulators, filters, amplifiers, A/Ds, D/As, radio DSP circuitry, memory, and bus interfaces. The memory stores user data and communication instructions. The DSP circuitry drives wireless communications with wireless access points.

Baseband circuitry 501 comprises CPU circuitry, memory, and bus interfaces. The memory stores software components like an operating system, network interface application, user interface application (user IF), and user applications. The bus interfaces of radio transceivers 502-503 and baseband circuitry 501 are coupled together over data connections—which all appear as dotted lines on FIG. 5. The CPU circuitry executes the operating system to interface between the CPU circuitry and the other software components. The network interface application drives signaling and user data exchanges over network connections. The user interface application drives signaling and user data exchanges over user wireless connections—including wireless D2D communications. The user applications provide user services like media conferencing, interactive gaming, internet access, and the like.

In operation, network radio transceiver 503 wirelessly attaches to wireless access points using a default antenna configuration that has all antennas active for both transmit and receive. Network radio transceiver 503 identifies its antenna data and exchanges antenna data with the serving wireless access points. Thus, network radio transceiver 503 receives external antenna data from the wireless access points. The network interface components in baseband circuitry 501 process the antenna data to select transmit and receive antennas in network radio transceiver 503. Baseband circuitry 501 then drives network radio transceiver 503 to exchange signaling and user data over the selected transmit and receive antennas.

User radio transceiver 502 accepts the wireless attachments of wireless user devices using a default antenna configuration that has all antennas active. User radio transceiver 502 identifies its antenna data and exchanges the antenna data with the attached wireless user devices. Thus, user radio transceiver 502 receives external antenna data from the wireless user devices. The user interface in baseband circuitry 501 processes the antenna data to select transmit and receive antennas in user radio transceiver 502. Baseband circuitry 501 then drives user radio transceiver 502 to exchange signaling and user data over the selected transmit and receive antennas.

As power drains in some of the wireless user devices, these devices modify their antenna configurations and report their antenna data over user radio transceiver 502 to the user interface in baseband circuitry 501. The user interface drives baseband circuitry 501 to select antennas based on the external antenna data in addition to its own antenna data. For example, if another wireless user device with low reserve power reduces to four orthogonal transmit antennas, then baseband circuitry 501 then selects a large set (32-64) of receive antennas that have a different geometric earth-orientations to communicate with the wireless user device in the low-power state.

In another example, a wireless user device with low reserve power reduces to two transmit antennas in the same geometric earth-orientation. Baseband circuitry 501 then selects all of its antennas at the same geometric earth-orientation to receive from the wireless user device in the low-power state. In yet another example, a stationary wireless user device with high reserve power uses eight orthogonal groups of eight antennas, and each antenna group transfers a different signal to provide eight simultaneous data flows for numerous user applications. Baseband circuitry 501 then selects its antennas to form eight groups that have the corresponding geometric earth-orientations to the antenna groups in the wireless user device.

Figure 6:
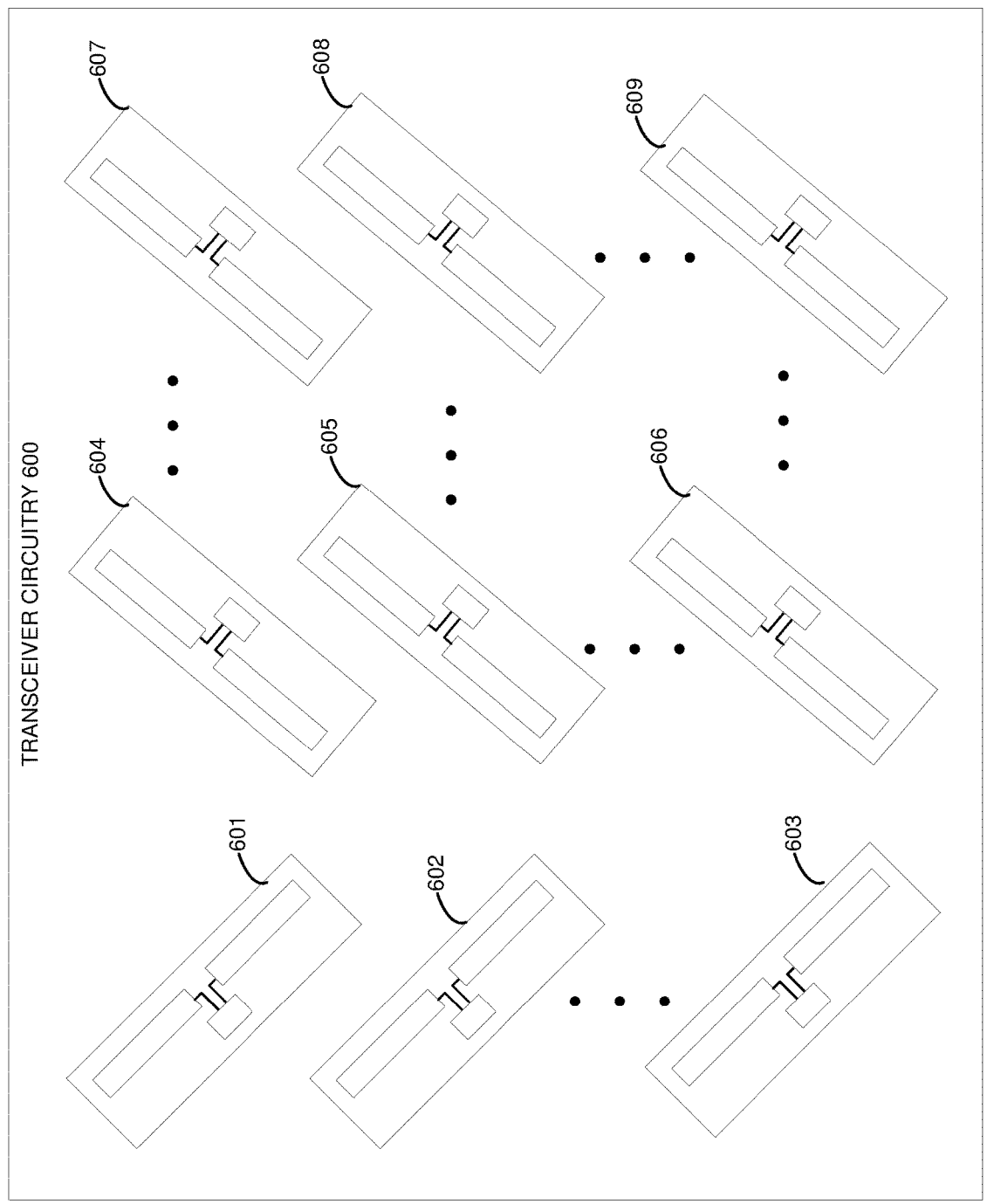
FIG. 6 illustrates transceiver circuitry with multiple center-tapped dipole antennas at different antenna orientations.

FIG. 6 illustrates transceiver circuitry 600 with multiple center-tapped dipole antennas 601-609 at various antenna orientations. Patch antennas can be used in other examples in a like manner. Dipole antennas 601-603 (and other antennas in the chain represented by the dots) share the same geometric earth-orientation. Dipole antennas 604-606 (and other antennas in that chain) share the same geometric earth-orientation, and this orientation is orthogonal to the orientation of dipole antennas 601-603. Dipole antennas 607-609 (and other antennas in the chain) share the same geometric earth-orientation, and this orientation is orthogonal to the orientation of dipole antennas 601-606. Orthogonality may be achieved through geometric earth-orientation, separation distance, radio shielding, operating frequency/time, and the like. Transceiver circuitry 600 can be made from micro-processing circuitry that has several printed internal antennas at various geometric earth-orientations and locations within the microprocessor chip. Each antenna is fixed within the micro-processing circuitry. Thus, the geometric earth-orientation of each antenna may be readily derived from the geometric earth-orientation of transceiver circuitry 600.

For example, an 5G NR wireless user device could be implemented in a single System-On-Chip (SOC) that has antennas, radio circuitry, baseband circuitry, and gyroscope circuitry. The baseband circuitry can read its current earth-orientation from the gyroscope circuitry and then translate the gyroscope orientation into individual antenna orientations based on the fixed relationship of the antennas within the circuitry. The SOC typically has a separate geographic positioning system like Global Positioning Satellite (GPS) circuitry that provides a geographic location for the SOC, and through a fixed translation, that indicates the geographic locations for the individual antennas.

Figure 7:
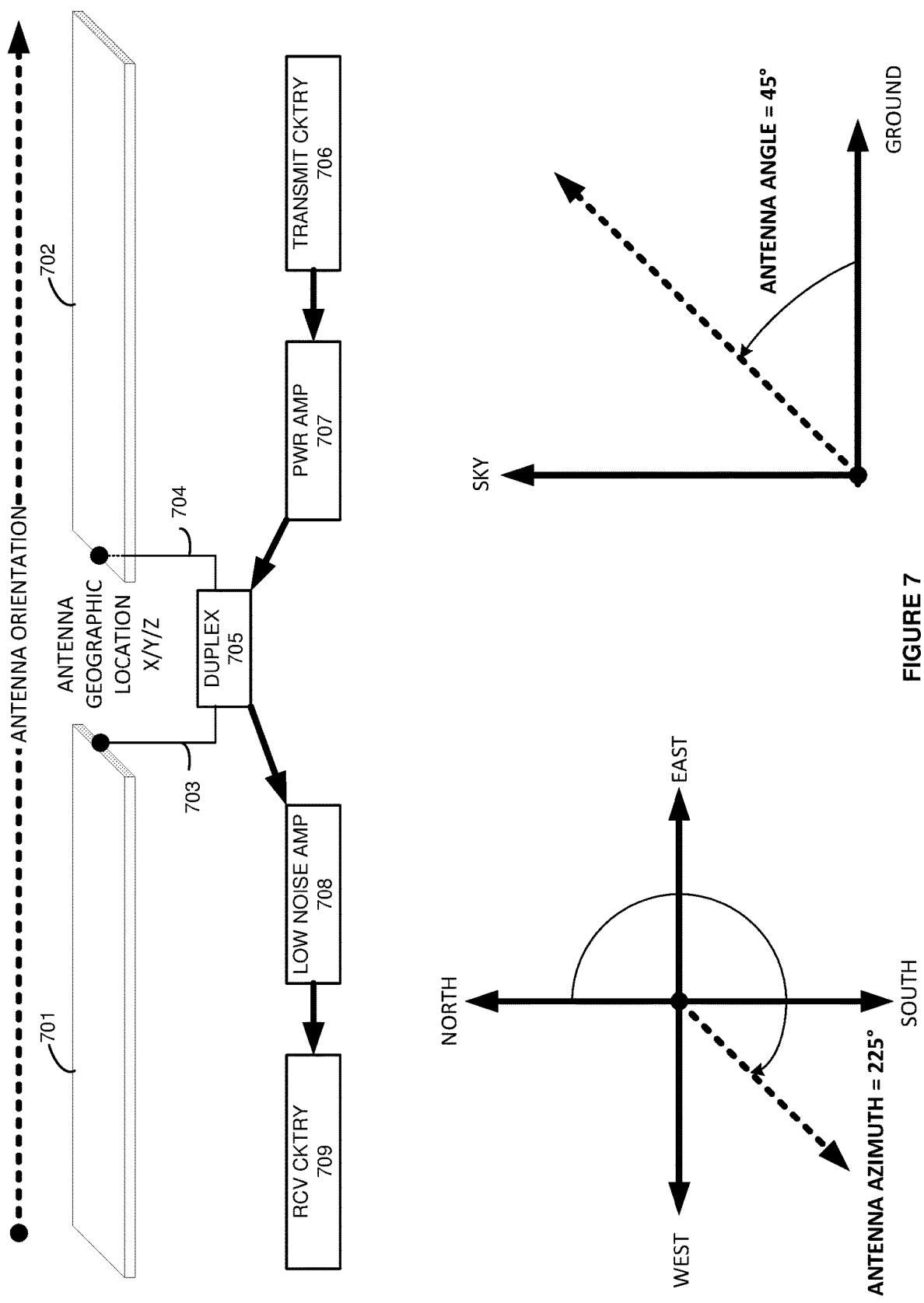
FIG. 7 illustrates a center-tapped dipole antenna and antenna orientation graphs.

FIG. 7 illustrates a center-tapped dipole antenna and its antenna orientation graphs. Patch antennas could be used in a like manner. The dipole antenna comprises antenna elements 701-702 and feed lines 703-704. Antenna elements 701-702 are each a rectangular bar-shaped metallic structure that may be very thin, very narrow, and around a millimeter long. Each antenna element 701-702 is typically sized at ¼ of the operating wavelength, so both antenna elements are positioned in-line to form a ½ wave dipole. Antenna elements 701-702 are center-tapped by feed lines 703-704. Feed lines 703-704 are coupled to power amplifier 707 and low noise amplifier 708 through duplexer 705. Transmit circuitry 706 drives wireless transmission from antenna elements 701-702 over power amplifier 707 and duplexer 705. Receive circuitry 709 drives wireless reception from antenna elements 701-702 over duplexer 705 and low noise amplifier 708. Transmit circuitry 706 and receive circuitry 709 may be separately controlled to configure antenna elements 701-702 as a transmit-only antenna, a receive-only antenna, or a transmit/receive antenna.

The dipole antenna made of antenna elements 701-702 has a geometric-earth orientation as indicated by the dotted line from the left edge of antenna 701 to the right edge of antenna element 702. Thus, the antenna orientation is also the geometric earth-orientation of the standing waves that form on antenna elements 701-702 and feed lines 703-704. The orientation graphs depict how geometric earth-orientation may be characterized. The graph on the left illustrates the azimuth of antenna elements 701-702 when viewed from above the earth surface. The azimuth is one aspect of the geographic direction that the antenna is pointing. The graph on the right illustrates the angle of antenna elements 701-702 when viewed from the earth surface looking perpendicular to the azimuth. The angle is another aspect of the geographic direction that the antenna is pointing.

On the azimuth graph, the azimuth of the geometric earth-orientation for antenna elements 701-702 is 225 degrees (pointing to the southwest). On the angle graph, the angle of the geometric earth-orientation for antenna elements 701-702 is 45 degrees (to the ground when looking southeast or northwest). Also note the antenna geographic location latitude/longitude/altitude (X/Y/Z) that is noted at the center tap. Together, the dipole antenna azimuth, angle, and location form a rich dataset to support wireless communications in user devices—especially wireless D2D communications between user communication devices that experience a low-power situation.

Figure 8:
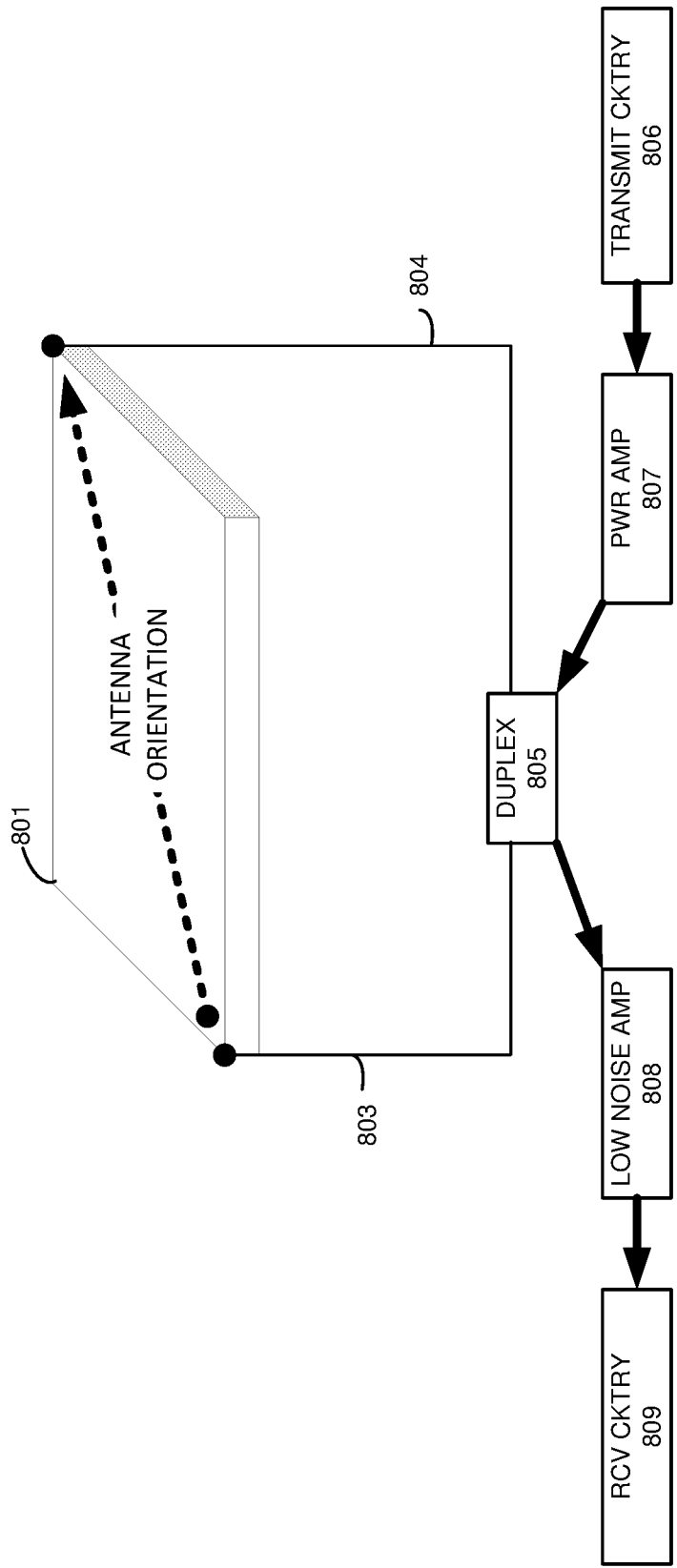
FIG. 8 illustrates a patch antenna and its antenna orientation.

FIG. 8 illustrates patch antenna 801 and its antenna orientation. Patch antenna 801 is a square-shaped metallic structure that may be very thin and around a millimeter across. Patch antenna 801 is typically sized at ½ of the operating wavelength. Patch antenna 801 is tapped at opposite corners (or sides) by feed lines 803-804. Feed lines 803-804 are coupled to power amplifier 807 and low noise amplifier 808 through duplexer 805. Transmit circuitry 806 drives wireless transmission from antenna 801 over power amplifier 807 and duplexer 805. Receive circuitry 809 drives wireless reception from antenna 801 over duplexer 805 and low noise amplifier 808. Transmit circuitry 806 and receive circuitry 809 may be separately controlled to configure patch antenna 801 as a transmit-only antenna, a receive-only antenna, or a transmit/receive antenna.

Patch antenna 801 has a geometric-earth orientation as indicated by the dotted line from the lower left edge to the upper right edge of patch antenna element 801. Note that patch antenna 801 could be circular, and patch antenna 801 could be driven from different edge points that that shown. The antenna orientation is the geometric earth-orientation of the standing waves that form on patch antenna 801. This orientation may be characterized by azimuth, angle or some other coordinate system as described above.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system comprising wireless communication devices that have antennas that have earth-orientations, the method comprising:
   the wireless communication devices wirelessly exchanging network signaling with a wireless access node over at least some of the antennas wherein some of the network signaling indicates Device-to-Device (D2D) communication times and frequencies;
   the wireless communication devices wirelessly exchanging device signaling with each other over at least some of the antennas using the D2D communication times and frequencies wherein some of the device signaling indicates the earth orientations for at least some of the antennas;
   the wireless communication devices selecting a subset of the antennas based on the earth orientations; and
   the wireless communication devices wirelessly exchanging user data with each other over the selected subset of the antennas using the D2D communication times and frequencies.

2. The method of claim 1 wherein:
   the wireless communication devices have batteries that have reserve powers;
   some of the device signaling indicates the reserve powers for the batteries;
   the wireless communication devices selecting the subset of the antennas based on the earth orientations comprises selecting the subset of the antennas based on the earth orientations and the reserve powers.

3. The method of claim 1 wherein:
   the wireless communication devices have the antennas that have on/off status;
   some of the device signaling indicates the on/off status for the antennas;
   the wireless communication devices selecting the subset of the antennas based on the earth orientations comprises selecting the subset of the antennas based on the earth orientations and the on/off status for the antennas.

4. The method of claim 1 wherein:
   the wireless communication devices have circuitry that executes a user application;
   some of the device signaling indicates the user application;
   the wireless communication devices selecting the subset of the antennas based on earth orientations comprises selecting the subset of the antennas based on the earth orientations and the user application.

5. The method of claim 1 wherein the earth-orientations for the antennas comprise antenna azimuth.

6. The method of claim 1 wherein the earth-orientations for the antennas comprises antenna angle.

7. The method of claim 1 wherein the earth-orientations for the antennas comprises geographic location.

8. The method of claim 1 wherein the wireless communication devices wirelessly exchanging the user data with each other comprises using Fifth Generation New Radio (5G NR).

9. The method of claim 1 wherein the wireless communication devices wirelessly exchanging the user data with each other comprises using Multiple Input Multiple Output (MIMO).

10. The method of claim 1 wherein the wireless communication devices wirelessly exchanging the user data with each other comprises using Carrier Aggregation (CA).

11. A wireless communication system comprising a first wireless communication device that has first antennas that have first earth-orientations and a second wireless communication device that has second antennas that have second earth-orientations, the wireless communication system comprising:
the first wireless communication device configured to wirelessly exchange first network signaling with a wireless access node over at least some of the first antennas wherein some of the first network signaling indicates Device-to-Device (D2D) communication times and frequencies;
the second wireless communication device configured to wirelessly exchange second network signaling with the wireless access node over at least some of the second antennas wherein some of the second network signaling indicates the D2D communication times and frequencies;
the first wireless communication device and the second wireless communication device configured to wirelessly exchange device signaling with each other over at least some of the first antennas and the second antennas using the D2D communication times and frequencies wherein some of the device signaling indicates the first earth orientations for at least some of the first antennas and the second earth orientations for at least some of the second antennas;
the first wireless communication device configured to select a first subset of the first antennas based on the first earth orientations and the second earth orientations;
the second wireless communication device configured to select a second subset of the second antennas based on the first earth orientations and the second earth orientations; and
the first wireless communication device and the second wireless communication device configured to wirelessly exchange user data with each other over the first subset of the first antennas and the second subset of the second antennas using the D2D communication times and frequencies.

12. The wireless communication system of claim 11 wherein:
the first wireless communication device has a first battery that has a first reserve power;
the second wireless communication device has a second battery that has a second reserve power;
some of the device signaling indicates the first reserve power and the second reserve power;
the first wireless communication device is configured to select the first subset of the first antennas based on the earth orientations, the first reserve power, and the second reserve power; and
the second wireless communication device is configured to select the second subset of the second antennas based on the first earth orientations, the second earth orientations, the first reserve power, and the second reserve power.

13. The wireless communication system of claim 11 wherein:
the first wireless communication device has the first antennas that have first on/off status;
the second wireless communication device has the second antennas that have second on/off status;
some of the device signaling indicates the first on/off status and the second on/off status;
the first wireless communication device is configured to select the first subset of the first antennas based on the first earth orientations, the second earth orientations, the first on/off status, and the second on/off status.

14. The wireless communication system of claim 11 wherein:
the first wireless communication device has the first circuitry that executes a user application;
the second wireless communication device has the second circuitry that executes the user application;
some of the device signaling indicates the user application;
the first wireless communication device is configured to select the first subset of the first antennas based on the first earth orientations, the second earth orientations, and the user application; and
the second wireless communication device is configured to select the second subset of the second antennas based on the first earth orientations, the second earth orientations, and the user application.

15. The wireless communication system of claim 11 wherein the first earth-orientations and the second earth-orientations comprise antenna azimuth.

16. The wireless communication system of claim 11 wherein the first earth-orientations and the second earth-orientations comprise antenna angle.

17. The wireless communication system of claim 11 wherein the first earth-orientations and the second earth-orientations comprise geographic location.

18. The wireless communication system of claim 11 wherein the first wireless communication device and the second wireless communication device are configured to wirelessly exchange the user data with each using Fifth Generation New Radio (5G NR).

19. The wireless communication system of claim 11 wherein the first wireless communication device and the second wireless communication device are configured to wirelessly exchange the user data with each using Multiple Input Multiple Output (MIMO).

20. The wireless communication system of claim 11 wherein the first wireless communication device and the second wireless communication device are configured to wirelessly exchange the user data with each using Carrier Aggregation (CA).

* * * * *